Patented Oct. 21, 1952

2,615,006

UNITED STATES PATENT OFFICE 2,615,006

PIGMENTARY MATERIALS

Frank W. Lane, Newport, Del., assignor to E. I. du Pont de Nemours & Company, Wilmington, Del., a corporation of Delaware No Drawing. Application April 5, 1948, Serial No. 19,180

7 Claims. (Cl. 260—37)

This invention relates to the manufacture of improved pigment substances and more particularly to the treatment of pigments to secure better wettability in paint liquids and to produce higher gloss in paint films in which they are employed. More specifically, this invention relates to the surface treatment of pigment substances, especially $TiO_2$, with small amounts of a silicone polymer in such a way as to improve materially the gloss and wettability displayed by the pigment on oleoresinous or in gloss emulsion coating compositions.

While pigment materials are employed in many applications, their greatest usefulness is found in coating compositions such as paints. A substantial proportion of such coating compositions are so formulated as to produce a glossy film when the paint has dried. In paints of this type, it is often desirable to produce as high a gloss as possible and while certain combinations of pigment and paint vehicle are satisfactory in this respect, others fall considerably short of the desired gloss level. In many cases it is found that low gloss in such systems is due to poor wetting of the pigment by the vehicle and that where means are discovered to improve the wetting and to prevent flocculation of the pigment, much better gloss is produced in the paint film. Some paint vehicles possess the ability to wet most pigments fairly well and where such vehicles are employed, little difficulty is encountered in producing paints with good gloss properties. However, other vehicles, particularly some of the newer synthetic materials, such as varnishes containing alkyd, urea-formaldehyde or vinyl resins, are quite sensitive with respect to the pigments which can be employed without impairing gloss. Pigments such as titanium dioxide which normally have a hydrophilic surface are particularly difficult to incorporate in such vehicles so as to produce high gloss enamels. A need has therefore existed for pigment materials having surface properties which permit easy wetting by paint vehicles and particularly by the sensitive vehicles mentioned above.

An important development in the paint field recently has been the commercial production of oleoresinous emulsion paints. Up to the present time, only flat paints of this type have been marketed owing to the difficulty of obtaining satisfactory gloss in emulsion paints. In order to obtain gloss in such a system, it is necessary that the pigment be present entirely in the oil phase, as any pigment in the water phase produces a flat surface when the water evaporates. Here again it is evident that a pigment material which is easily and preferentially wet by the oil phase would be a real contribution to the art in this field.

The primary object of my invention is the production of a novel treated pigment having superior gloss properties when employed in oleoresinous or gloss emulsion coating compositions. An additional object is the production of a pigment having superior wettability by paint vehicles and particularly by relatively poor wetting vehicles, such as many of the newer synthetic resin systems. Still another object is the production of a pigment material which makes possible savings in paint grinding costs by yielding thinner consistency mixtures with paint vehicles and consequently requiring less of the vehicle in the mill base. Other objects will become apparent from the ensuing description of my invention.

These and other objects are attainable in this invention which comprises producing a hydrophobic pigment material by intimately associating with a pigmenting substance a minor amount of a silicone polymer or organopolysiloxane. The term "silicone" is a generic term for all polymeric organosiloxanes. Pure compounds of the latter type are designated as individual siloxanes while "silicone" denotes a general type of organopolysiloxane. (Chemical Reviews, volume 41, August 1947, p. 130.)

In a more restricted embodiment, my invention comprises commingling with a pigment material from about 0.05% to 5% based on the pigment weight of a silicone polymer containing substantially hydrophobic organic radicals and subsequently subjecting the mixture to a milling treatment.

A more specific and preferred embodiment of my invention comprises surface treating a previously calcined titanium dioxide pigment to coat it with from about 0.1% to 3% by weight, based on the weight of titanium dioxide, of a silicone polymer or organopolysiloxane, said polymer being dissolved in a suitable organic solvent, and subsequently subjecting the mixture of titanium dioxide and silicone polymer to a milling treatment, such as in a fluid energy mill or steam micronizer of the type, for example, described in U. S. Patent 2,032,827.

The term "silicone polymer" is commonly given to polymeric compounds having the cross-linking type of unit structure

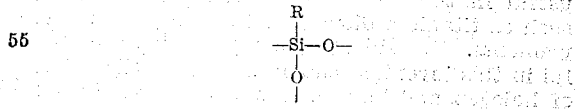

or the straight chain-forming unit

or mixtures and co-polymers thereof, where R and R' are the same or different organic radicals joined directly to the silicon atom through carbon and the term "silicone polymer" has this meaning where employed in this application. These organosiloxane polymers are usually formed through the molecular condensation to siloxanes of organosilanols ($R_nSi(OH)_{4-n}$ wherein R comprises substituted or unsubstituted mono-, di- or tri-alkyl, aryl, aralkyl, alkaryl substituents or mixtures thereof, such as methyl, ethyl, propyl, butyl, phenyl, benzyl, tolyl, naphthyl, etc. and $n$ is an integer from 1 to 3.) These silanols can be obtained from the hydrolysis of the corresponding halogenosilanes. Specific types of silanols include trimethylsilanol, triethylsilanol, diethylsilanediol, diphenylsilanediol, etc.

While intermolecular condensation comprises one method of forming the linear and cyclic organosiloxanes or silicone polymers useful in this invention, they can also be obtained by other methods. Thus an organosilane, particularly tetraalkyl and tetraaryl silanes, corresponding to the formula $R_4Si$, may be oxidized for such purpose, one example thereof being the oxidation of tetraethylsilane to form ethyl silicone. Other methods known to the art can also be resorted to in effecting preparation of the desired silicone polymer. (Note Chemical Reviews article above.)

Such silicone polymers exist in widely varied physical form, some being thin liquids, others having the form of thicker oils and greases and still others existing as hard resins, depending on the proportion and character of the organic radicals present and on the conditions to which the polymer was subjected during its formation. While certain of these polymers are somewhat more effective treating agents for pigment materials than are others, it is believed that the entire class will produce the desired result, so long as the character of the organic radicals present is substantially hydrophobic. The majority of silicone polymers commercially produced utilize methyl, ethyl or phenyl groups as the organic radicals and these are all hydrophobic in character. The great majority of silicone polymers which may conceivably be produced fall in this class and consequently should be useful when employed in this invention.

Liquid silicone compositions suitable for use in this invention include both thermosetting and the ordinary molding powders which do not change in molecular weight while being processed as described above. The thermosetting silicone polymers are of particular interest as a very high quality pigment can be obtained by addition to the pigment feed going to a fluid energy grinding mill which utilizes high temperature (100° C.–400° C.) and high pressure steam in the production of very fine pigment materials. Grinding of the pigment is effected at the same time the pigment is converted to a hydrophobic product. This method of operation is particularly useful in the processing of titanium pigments such as titanium dioxide and extended titanium pigments. The silicone polymers which are useful in this invention should be substantially free of halogen and halogen compounds, due to the fact that liberation of halogen compounds will be undesirable in the later use of the pigment. Hydrochloric acid will be split off by hydrolysis from substituted organochlorosilanes which might remain in the silicone polymer and the avoidance of this is urged.

To a more complete understanding of the invention, the following specific examples are given, which are to be construed as merely in illustration but not in limitation of the invention:

EXAMPLE I

The following ingredients were added to a change-can paint mixer and mixed until the resulting paste was apparently homogeneous:

Toluene solution containing 58% by weight
 of methylsiloxane resin having a $CH_3$:Si
 ratio of 1.5_____grams__ 78
Mineral spirits _____c. c__ 2000
Normal commercial titanium dioxide
  grams__ 4540

After mixing, the paste was dried in an oven at 80° C. The treated pigment was then subjected to a milling operation consisting of passage through a steam micronizer, the steam being superheated to 275° C.

The resulting treated pigment was then tested for wettability by incorporating it into each of two different paint vehicles, using a Hankoczy-Brabender Plastograph, as described in British Patent #340,297. This instrument consists of a constant temperature paint mixer with a torque balance attached to the shaft connecting the mixer blades and the motor, so that relative resistance to mixing is indicated and recorded during the mixing operation. In these tests, the paint vehicle was first added to the mixing compartment with the mixer running, and the balance adjusted so as to give a zero reading on the scale. The predetermined amount of pigment was then added gradually and the scale reading observed while the pigment was being wet by vehicle and after wetting was complete. The formulations employed contained the following parts by weight of the ingredients listed:

Formulation A

Alkyd varnish (containing 50% by weight of
 non-volatile material) _____ 146
Treated titanium dioxide _____ 370

Formulation B

Vinyl resin varnish (containing 20% vinyl
 resin, 40% nitroethane and 40% xylol)___ 150
Treated titanium dioxide _____ 200

In the case of Formulation A, a scale reading of 110 was obtained on the Plastograph when mixing was complete. A similar test was made using the same formulation except that instead of the silicone-treated titanium dioxide, an equal weight of untreated titanium dioxide was employed. With the untreated pigment, a scale reading of 380 resulted, demonstrating that the untreated pigment produced more than three times as much thickening in the vehicle as did an equal weight of pigment which had been treated with the silicone polymer. In addition, wetting and mixing of the treated pigment occurred much more rapidly than with the untreated sample.

In Formulation B, the silicone-treated titanium dioxide was readily wetted and when thoroughly incorporated produced a scale reading on the Plastograph of 10, only slightly higher than that of the vehicle alone. A similar test was made using the same formulation except that instead of the treated pigment, an equal weight of normal untreated titanium dioxide was employed. In this case, the pigment was not wet by the vehicle but instead floated on the surface in a manner resembling the behavior of talc on water. After prolonged mixing in the Plastograph, the bulk of the untreated pigment was completely dry and separate from the paint vehicle.

EXAMPLE II

A baking refrigerator enamel was prepared using the titanium dioxide treated with silicone polymer, the preparation of which was described in Example I. 220 parts by weight of a urea-alkyd varnish containing 55% by weight of non-volatile material were placed in a change-can paint mixer and to this were added 300 parts of the treated titanium dioxide. These ingredients were thoroughly admixed and thereafter ground by passage through a 5-roll paint mill. The resulting mill base was reduced with a mixture of 360 parts of urea-alkyd varnish containing 50% by weight of non-volatile material, 121 parts of xylol, and 14 parts of butanol.

This enamel was further reduced to spray consistency with a solvent mixture containing 90% by weight of xylol and 10% of butanol. It was then sprayed onto primed steel panels which, after air-drying for one hour, were baked for thirty minutes at 150° C.

Similar panels were prepared from a refrigerator enamel made in exactly the same way except that in place of the silicone-treated titanium dioxide, an equal weight of a normal untreated titanium dioxide was employed. It was found that these panels were very considerably inferior in gloss to those made with the enamel containing the titanium dioxide treated with the silicone polymer.

EXAMPLE III

Previously-calcined and wet-ground titanium dioxide of the rutile type, in slurry form, was treated with aluminum oxide in the manner disclosed in U. S. Patent #2,284,772. 11.25 liters of the resulting aqueous slurry, containing 2700 grams of alumina-treated pigment, were thoroughly admixed with 46.1 grams of a xylene solution containing 58.5% by weight of ethylphenyl-trisiloxane, having the formula $$[(C_2H_5)(C_6H_5)SiO]_3$$

This represented a treatment with 1% by weight of silicone polymer on the pigment basis. After mixing, the slurry was filtered, washed with water and dried at 138° C. The dry treated pigment was then milled by passing it through a steam micronizer in which it was subjected to the action of steam superheated to 315° C.

A similar pigment was prepared in exactly the same way except that only 0.4% by weight of silicone polymer, based on the titanium dioxide, was added. Still other pigments were prepared in exactly the same manner except that 0.2% and 0.1% by weight, respectively, of silicone polymer, based on the weight of titanium dioxide, were employed. Still another pigment was prepared in the same manner except that the step comprising the treatment with silicone polymer was completely omitted.

Each of the five pigments whose preparation is described above was incorporated in a baking refrigerator enamel of the urea-alkyd type, having a weight ratio of pigment to fixed binder of 0.8 to 1. In the preparation of these enamels, the pigment was first mixed in a change-can mixer with 40% of the total vehicle. The resulting mill base was passed through a 5-roll paint mill and then reduced by mixing with the remainder of the urea-alkyd vehicle.

These enamels were compared for pigment fineness by observation of films laid down on glass by a 0.0002 inch draw-down blade, while to compare gloss, the enamels were further reduced to spray consistency by the addition of a solvent mixture containing 90% by weight of xylol and 10% of butanol and sprayed onto primed steel panels which were air-dried for one hour and baked for 30 minutes at 150° C.

Fineness, or absence of grit, on the draw-downs, and gloss on the sprayed panels were then graded visually on an arbitrary scale ranging from 1 to 10, the value 10 representing the smallest amount of grit or the highest gloss. In addition, gloss of the sprayed panels was measured by a gloss-meter in which the proportion of a 45° incident light beam which is specularly reflected is observed by a photo-cell and given as a certain percentage of that reflected from a standard surface. The results of these gradings and measurements are shown in the following table:

| Percent Silicone Polymer added | Fineness | Gloss | |
|---|---|---|---|
| | | Visual | Meter |
| 1.0 | 10 | 8 | 114 |
| 0.4 | 8 | 10 | 115 |
| 0.2 | 8 | 8 | 116 |
| 0.1 | 7 | 5 | 114 |
| None | 1 | 1 | 105 |

It is evident that substantial improvement both in fineness and in gloss properties was produced by treatment according to my invention and that this improvement was secured by the use of only 0.1% addition of polymer, although somewhat greater effects were observed by the use of higher amounts of the silicone polymer.

Although above described as applied to certain specific and preferred embodiments, the invention is not limited thereto, nor to the specific types or amounts of treating agent, types of pigment or manner of incorporation mentioned. While titanium dioxide of either the rutile or the anatase crystalline form comprises a preferred type of calcined pigment-developed prime white pigment substances adapted for treatment herein, other white or colored pigment substances may be treated advantageously and beneficially in accordance with my invention. Examples of such other previously-calcined, white pigments include zinc sulphide, lithopone, titanated lithopones, zinc oxide, various titanates such as the alkaline earth titanates and extended forms of such titanium and prime white pigments where the extender consists of calcium sulfate, barium sulfate, magnesium silicate and the like. Additionally, treatment is also contemplated of various colored pigments, particularly those of the inorganic type, such as ultramarine blue, chrome yellow, basic zinc chromate, chrome red, chrome orange, barium chromate, chrome green, iron blue, earth colors such as iron oxide, zirconium silicate, extended colors, and the like. Also, the invention is applicable to the treatment of organic pigment substances, such as phthalocyanine pigments, e. g., phthalocyanine blue as well as other finely-divided organic substances. The greatest improvement in gloss and wettability by organic liquids over prior art pigments will be secured by this invention when the pigment to be treated has, in its normal untreated state, a relatively hydrophilic surface, as is the case with titanium dioxide. However, considerable improvement is secured by this treatment even when the pigment to be treated has a mildly hydrophobic surface, as the hydrophobic properties become more pronounced.

The examples set forth above describe the use of amounts of polymer ranging from 0.2% to 1% by weight, based on the weight of pigment and certain specific silicone polymers. However, these amounts and types of polymers do not constitute limitations on the invention. Thus, in some cases as little as 0.05% of silicone polymer suffices to produce the desired coating effect, while in other cases up to 5% may be used. For most purposes, treatments falling in the range from 0.1% to 3% by weight will be found to produce optimum results and hence such latter amounts are preferred for use. Other useful types of polymers include such linear polymethylsiloxanes (oils) as

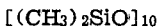
$$[(CH_3)_2SiO]_{10}$$

the decamer; cross-linked methyl silicones (resins) such as those having $CH_3:Si$ ratios of 1.3 to 1.6; phenyl silicones such as result from diphenylsilanediol condensation, e. g. the cyclic timer, hexaphenylcyclotrisiloxane, or the tetramer, octaphenylcyclotetrasiloxane; hexabenzylcyclotrisiloxane, or $[(C_6H_5CH_2)_2SiO]_3$; mixed siloxanes such as methyl phenyl silicone resin wherein 1 to 10 methyl groups are present for each phenyl radical; and other higher aryl silicones which are generally thermoplastic, e. g. naphthyl silicones, diphenyl silicones, etc. Additional examples of organosiloxanes include those listed at page 127 of the Chemical Reviews publication above referred to.

If desired, one may employ as the source of the silicone a dimer or trimer or other incompletely condensed material in treating the pigment and then resort to a heat-milling treatment to effect further polymerization of the silicone polymer directly on and in association with the pigment.

The silicone polymer may be added to the pigment in any manner which produces intimate association. Where the polymer selected is a thick grease or resin, it is desirable to apply it to the pigment in solution, in order that it may cover the pigment surface more uniformly. This is unnecessary where a silicone polymer of thin consistency is employed or when the treatment is followed by intensive milling, although in most cases use of a solvent will be found desirable. The treatment may be made equally well on dry pigment or on pigment which is in the form of an aqueous paste or slurry. The method of this invention is particularly applicable to treatment of aqueous systems when it is desired to flush the pigments from the water into an oil phase. While it is possible to make the treatment on relatively dilute aqueous pigment suspensions, it is generally more convenient to employ more concentrated slurries to facilitate mixing. Where treatment is to be made on dry pigment, any one of a number of methods for applying the polymer may be employed. Thus, a solution of the silicone polymer may be sprayed onto the pigment material as the pigment is being continuously transported on a belt or screw conveyor or while the pigment is being agitated in tumbling apparatus. The treatment may also be made by spraying or dipping a solution of the polymer onto the pigment material spread out on trays or the like. Where treatment is to be made on an aqueous slurry or paste, the addition of polymer may be made in any of the usual types of mixing equipment.

In the preferred embodiment of this invention, the treated pigment is subjected to a milling treatment in order to produce intimate association of pigment and silicone polymer. Obviously, this may be effected in any desired manner and by any desired means or in any type of conventional milling apparatus which will effect intimate mixing and association of the polymer with the pigment. Thus, the treated pigment may be conveniently passed through a suitable mixer or through a pulverizer, such as a ring roll mill equipped with air separator, and then through a disintegrator, such as a rotary hammer mill. The milling treatment may also be performed by passing the treated pigment directly through a disintegrator of the rotary type or through a steam or air jet disintegrator, such as a micronizer, as contemplated in the preferred adaptation of the invention.

The majority of organic treating materials, such as have been employed in certain prior art pigments to increase gloss and wettability, begin to objectionably discolor at relatively high temperatures so that it is necessary to avoid high temperature drying or grinding of the pigment under treatment with such materials to avoid impairment of pigment color. The use of organic materials of this type prior to passage of the treated pigment through a steam micronizer is generally precluded as a result of the extent of the color degradation. However, when the novel pigment material prepared according to this invention is micronized, the color of the pigment is not impaired. This is due to the high thermal stability of silicone polymers as compared to purely organic polymeric materials and constitutes a distinct advantage, permitting wide flexibility in the manner in which treatment may be made.

The improved wettability of pigment materials in paint vehicles as achieved by the practice of my invention leads to important benefits for the paint manufacturer. Thus the capacity of mixing equipment is increased by the ease with which the treated pigments are wetted and the short times required for thorough mixing with the paint liquids. In addition, it is possible to incorporate a higher percentage of this type of pigment into such paint mixes while retaining suitable consistency for mixing and grinding than where prior art pigments are used. This results in savings during the paint grinding step since the volume of paste which must be ground to produce a given volume of paint is considerably reduced.

Many of the inorganic pigment materials are more easily wetted by water than by organic liquids such as are used in paint manufacture, and for this reason they are regarded as hydrophilic, although they could also be regarded as organophobic. These characteristics vary from pigment to pigment and the silicone treatment as mentioned above will convert titanium dioxide to a hydrophobic pigment and will increase the tendency of other pigments to be wetted by organic liquids. The resulting products are strongly organophilic in character, and this property makes them more attractive in paint manufacture as extensive grinding is unnecessary in order to incorporate the finely-divided pigment in the organic vehicle.

In addition to the specific solvents used in the examples, other organic types of solvents useful in effecting organosiloxane polymer dissolution and which will enable application of the polymer to the pigment while in liquid state can also be used. Thus, such low-boiling solvents as acetone, ether, benzene, etc., medium or higher boiling types, such as chlorinated hydrocarbons, etc., can be utilized for liquefying the polymer whereby it can be used to uniformly coat the pigment under treatment.

This application is a continuation-in-part of my copending application Serial Number 604,303, filed July 10, 1945 which, subsequent to the filing of this application, has been abandoned.

I claim as my invention:

1. A process for improving the gloss and wettability properties of a white, calcined, hydrophilic inorganic pigment to be employed in an oleoresinous and gloss emulsion type coating composition which comprises converting said pigment to hydrophobic form by mixing with said pigment prior to employment in the coating composition from about 0.05% to 5% by weight, on the pigment basis, of a halogen-free silicone polymeric compound having the unit structure

wherein R and R' are hydrophobic organic hydrocarbon radicals, and milling the resulting mixture in an atmosphere of superheated steam in a fluid energy mill.

2. A process for improving the gloss and wettability properties of a hydrophilic pigment substance to be employed as the pigmenting ingredient in an oleoresinous and gloss emulsion type coating composition vehicle which comprises converting said pigment to hydrophobic form by mixing with said pigment prior to employment in the coating composition from about 0.1% to 3% by weight, on the pigment basis, of a halogen-free silicone polymeric compound having the unit structure

wherein R and R' are hydrophobic organic hydrocarbon radicals, and milling the resulting mixture in an atmosphere of superheated steam in a fluid energy mill.

3. A process for improving the gloss and wettability properties of a calcined titanium oxide hydrophilic pigment to be employed as the pigmenting ingredient in an oleoresinous and gloss emulsion type coating composition vehicle which comprises converting said pigment to hydrophobic form by mixing with said pigment from about 0.1% to 3% by weight, on the pigment basis, of a halogen-free silicone polymeric compound having the unit structure

wherein R and R' are hydrophobic organic hydrocarbon radicals, and milling the resulting mixture in an atmosphere of superheated steam in a fluid energy mill.

4. A process for improving the gloss and wettability properties of a hydrophilic pigment to be employed as the pigmenting ingredient in an oleoresinous and gloss emulsion type coating composition vehicle which comprises converting said pigment to hydrophobic form by adding to said pigment from about .05% to 5%, based on the weight of the pigment, of a liquid thermosetting silicone polymeric compound having the unit structure

wherein R and R' are hydrophobic organic hydrocarbon radicals, and then milling the resulting mixture at temperatures ranging from 100–400° C. in an atmosphere of superheated steam in a fluid energy mill.

5. A process for improving the gloss and wettability properties of a hydrophilic pigment to be employed as the pigmenting ingredient in an oleoresinous and gloss emulsion type coating composition vehicle which comprises converting said pigment to hydrophobic form by adding to said pigment an organic solvent solution containing from about 0.1% to 3%, based on the weight of the pigment, of a liquid thermosetting silicone polymeric compound having the unit structure

wherein R and R' are hydrophobic organic hydrocarbon radicals, and then milling the resulting mixture at temperatures ranging from 100–400° C. in an atmosphere of superheated steam in a fluid energy mill.

6. A process for the production of an improved TiO$_2$ pigment which comprises coating said pigment with from about 0.1% to 3% by weight, on the pigment basis, of halogen-free ethylphenyltrisiloxane, and then milling the resulting mixture of pigment and polymer in an atmosphere of superheated steam in a fluid energy mill.

7. A process for the production of an improved coating composition TiO$_2$ pigment to be employed in an oleoresinous and gloss emulsion type vehicle which comprises converting said pigment from hydrophilic to hydrophobic state by coating said pigment with from about 0.1% to 3% by weight, on the pigment basis, of halogen-free methylsiloxane resin in an organic solvent, and then milling the resulting mixture of pigment and polymer in an atmosphere of superheated steam in a fluid energy mill.

FRANK W. LANE.

REFERENCES CITED

The following references are of record in the file of this patent:

UNITED STATES PATENTS

| Number | Name | Date |
| --- | --- | --- |
| 2,000,003 | Verbyla | Apr. 30, 1935 |
| 2,258,218 | Rochow | Oct. 7, 1941 |
| 2,377,600 | Barker et al. | June 5, 1945 |
| 2,389,491 | Dunlap et al. | Nov. 20, 1945 |
| 2,395,550 | Iler | Feb. 26, 1946 |
| 2,405,988 | Barry | Aug. 20, 1946 |
| 2,424,853 | Safford | July 29, 1947 |
| 2,510,661 | Safford | June 6, 1950 |